(12) United States Patent
Smith

(10) Patent No.: US 6,173,045 B1
(45) Date of Patent: Jan. 9, 2001

(54) ELECTRONIC TELEPHONE BOOK

(75) Inventor: James Oval Smith, Irving, TX (US)

(73) Assignee: Texas Instruments Incorporated, Dallas, TX (US)

( * ) Notice: Under 35 U.S.C. 154(b), the term of this patent shall be extended for 0 days.

(21) Appl. No.: 08/478,567

(22) Filed: Jun. 7, 1995

Related U.S. Application Data

(63) Continuation of application No. 08/083,209, filed on Jun. 25, 1993, which is a continuation of application No. 07/722,571, filed on Jun. 27, 1991, now abandoned.

(51) Int. Cl.$^7$ .................................................. H04M 11/00
(52) U.S. Cl. ........................ 379/93.23; 379/201; 379/354
(58) Field of Search .......................... 379/88, 93, 96–98, 379/201, 207, 354–357, 93.01, 93.05–93.08, 93.17–93.27; 178/18

(56) References Cited

U.S. PATENT DOCUMENTS

| | | | |
|---|---|---|---|
| 4,633,041 | * | 12/1986 | Boivie et al. .......................... 379/354 |
| 4,649,543 | * | 3/1987 | Riskin .................................... 379/97 |
| 4,649,563 | * | 3/1987 | Riskin .................................... 379/97 |
| 4,709,387 | * | 11/1987 | Masuda ................................ 379/354 |
| 4,814,760 | * | 3/1989 | Johnston et al. . | |
| 4,822,751 | * | 4/1989 | Ishizu et al. . | |
| 4,839,919 | * | 6/1989 | Borges et al. ......................... 379/96 |
| 4,885,580 | * | 12/1989 | Noto et al. ............................ 379/96 |
| 4,933,968 | * | 6/1990 | Iggulden ............................. 379/355 |
| 5,097,502 | * | 3/1992 | Suzuki et al. ........................ 379/354 |
| 5,179,587 | * | 1/1993 | Bock et al. ........................... 379/94 |
| 5,204,894 | * | 4/1993 | Darden ................................ 379/355 |

FOREIGN PATENT DOCUMENTS

| | | | |
|---|---|---|---|
| 0 354 703 | * | 2/1990 | (EP) ...................................... 379/96 |
| 2 165 420 | * | 4/1986 | (GB) .................................... 379/201 |
| 62-157447 | * | 7/1987 | (JP) ..................................... 379/357 |

* cited by examiner

Primary Examiner—Wing F. Chan
(74) Attorney, Agent, or Firm—W. Daniel Swayze, Jr.; Wade James Brady, III; Frederick J. Telecky, Jr.

(57) ABSTRACT

An electronic telephone book comprises a central processing unit, interface circuitry for coupling the central processing unit to a telephone line and a display comprising output circuitry to output information and control graphics and input circuitry for generating control signals responsive to user interaction with the control graphics.

11 Claims, 5 Drawing Sheets

ELECTRONIC TELEPHONE BOOK

This is a Continuation of application Ser. No. 08/083,209 filed Jun. 25, 1993; which is a Continuation of Ser. No. 07/722,571, filed Jun. 27, 1991 now abandoned.

TECHNICAL FIELD OF THE INVENTION

This invention relates in general to telecommunications, and more particularly to an electronic telephone book.

BACKGROUND OF THE INVENTION

Each year, hundreds of millions of telephone books are reprinted for distribution to households and businesses around the world. The telephone books are updated yearly, even though the dynamic portion of the telephone book (that portion which actually changes) is extremely small. Consequently, an enormous amount of energy and natural resources are consumed in order to revise a relatively small amount of information.

Several computer programs now provide autodialing features, which allow the user to generate a list of his or her most frequently called numbers. A selected number may be dialed by pressing a button. Autodial features are also found on many phones, wherein each button corresponds to a frequently dialed number.

Autodialing features, while reducing the frequency with which the telephone book is used, does not relieve the necessity for updated information. Hence, autodialing phones and computer programs do not diminish the need for updated telephone books on a yearly basis.

Another problem with telephone books is the arrangement of advertisements in the yellow pages. To conserve money, a business operation will normally advertise in only one section. Therefore, a store which sells appliances, video, audio and photographic products will normally advertise in only section, or will place a advertisement in one section and have a plain listing in the other sections. Consequently, a potential customer searching for a particular good or service may not get a full listing of providers from the yellow pages.

Therefore, a need has arisen for a replacement to the traditional telephone book which reduces the waste involved in yearly updates to the telephone book and which provides more advanced searching capabilities.

SUMMARY OF THE INVENTION

In accordance with the present invention, an electronic telephone book is provided which eliminates substantial problems associated with the prior art.

The electronic telephone book comprises a central processing unit and telephone interface circuitry for coupling a central processing unit to a telephone line. A display comprises output circuitry to output information and control graphics and input circuitry for generating control signals responsive to user interaction with the control graphics.

The present invention provides significant advantages over the prior art. The electronic telephone book replaces the telephone directory and yellow pages without losing the ability to display graphic advertisements as well as text line listings. The size of the electronic telephone book may be significantly less than that of a medium-sized metropolitan telephone book. Information may be retrieved from the telephone company's central office, thereby eliminating the need to provide updates to telephone books. Searching can be done electronically on a number of fields such as name, category or keywords, thereby providing a more accurate listing of yellow page advertisers.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1A:
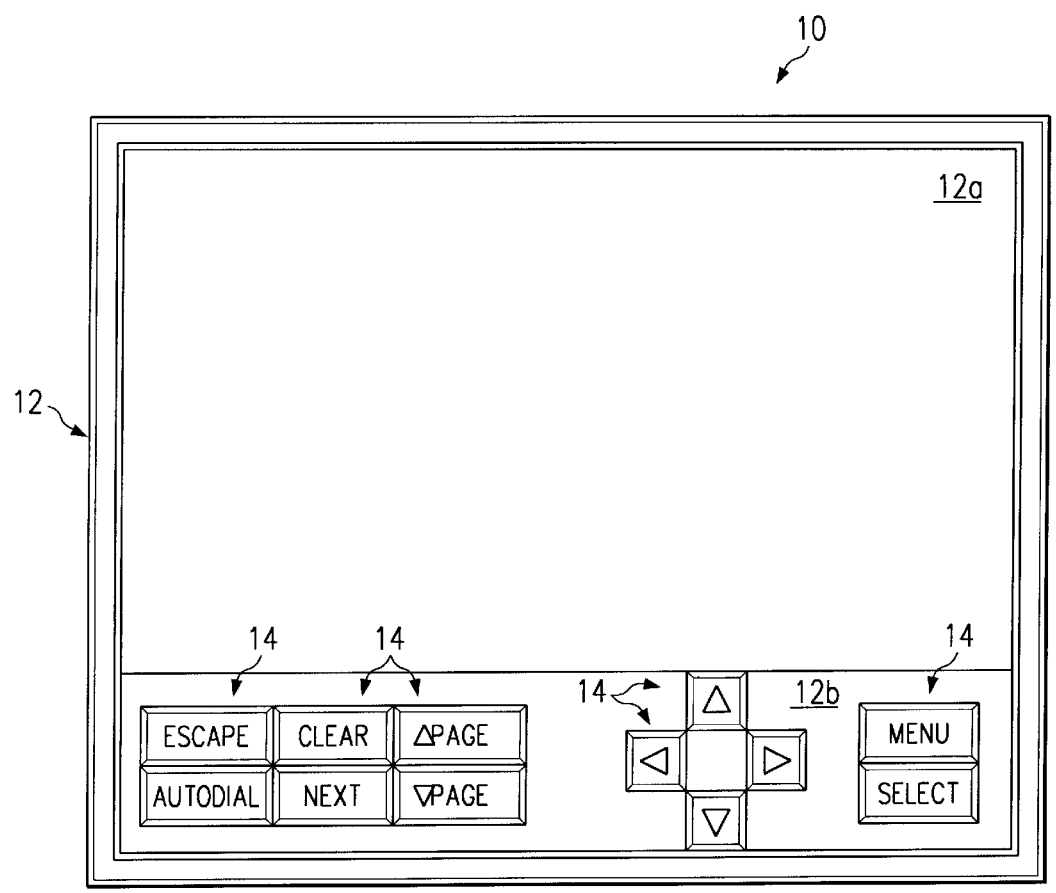
FIGS. 1a–c illustrate top, front and back plan views, respectively, of the electronic telephone book.
Figure 1B:
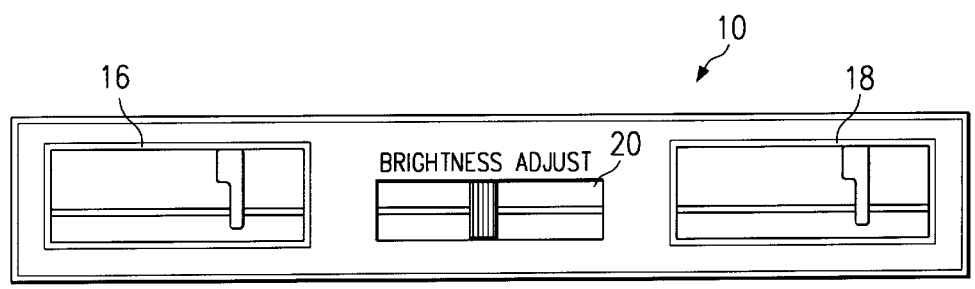
Figure 1C:
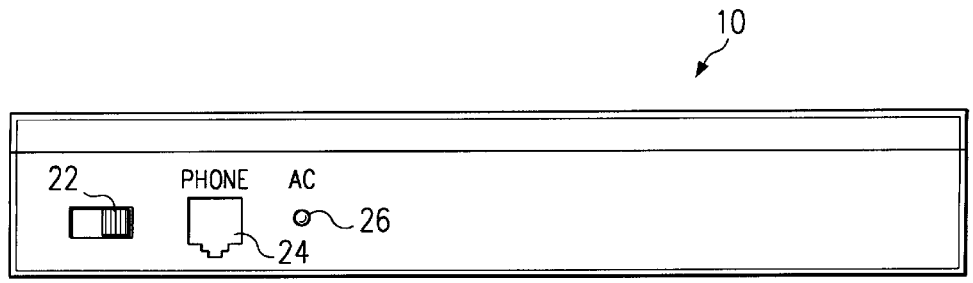
Figure 2:
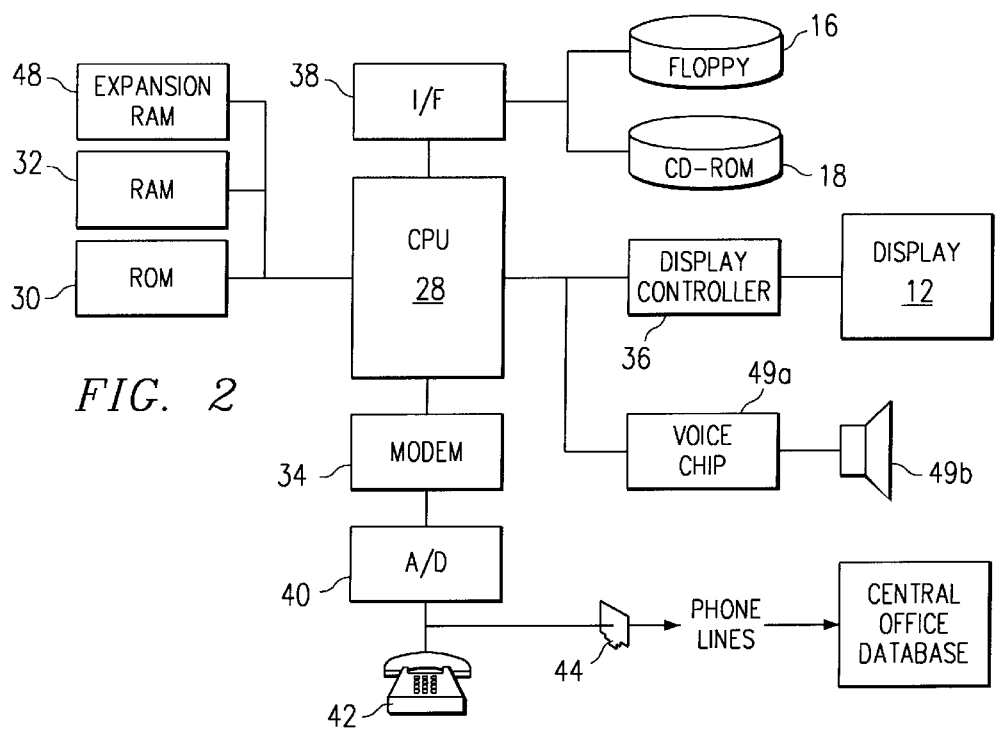
FIG. 2 illustrates a schematic representation of the preferred embodiment of the electronic circuitry of the electronic telephone book.

The preferred embodiment of the present invention and its advantages are best understood by referring to FIGS. 1–3 of the drawings, like numerals being used for like and corresponding parts of the various drawings.

FIGS. 1a–c illustrate top, front and back plan views of the exterior of the electronic telephone book 10, respectively. The display 12 is partitioned by the software to provide a viewing area 12a and a control area 12b. The size of the areas may be modified during the operation of the telephone book as needed. Viewing area 12a outputs text and graphics to the user while control area 12b outputs visual "software buttons" 14 which the user may use to interact with the electronic telephone book 10. Typically, the display 12 is an LCD (liquid crystal display), but could also be an LED or a thin-film active cell display, among other technologies. To receive inputs from the user, IR (infrared) or other light detection sensors, acoustical wave glass or a contact membrane may be provided. Hence, physical contact with the display 12 may be detected and the location of the contact will indicate the desired action.

In FIG. 1a, several software buttons 14 are shown: Escape, Clear, Page Up, Page Down, AutoDial, Next, Menu, Select, and cursor control keys. The actual keys displayed during operation of the system will depend upon the application being performed. While a standard keyboard could alternatively be coupled to the electronic telephone book, the software button provide superior flexibility and control, as will be shown in greater detail hereinbelow.

Shown in FIG. 1b, the electronic telephone book 10 further comprises a floppy disk drive 16 and a CD ROM drive 18. A brightness adjust 20 allows the user to adjust the brightness of the display. In FIG. 1c, the bottom of the electronic telephone book 10 provides an on/off switch 22, a phone jack 24 and an AC plug 26.

In operation, the electronic dialer 10 is coupled in parallel with a standard telephone to the household or business lines. Alternatively, the phone and the electronic telephone book may be an integral unit. The user operates the electronic telephone book 10 via the software buttons 14 to look up and to dial phone numbers. The drives 16 and 18 may be used to provide programming code for the electronic telephone book 10 or to store information locally within the electronic telephone book 10. For example, floppy drive 16 may contain data regarding the user's most frequently dialed numbers, along with address and personal information. CD ROM drive 18 may contain mass data, such as important phone numbers throughout the United States. Drives 16 and 18, however, are optional to the electronic telephone book 10.

Importantly, the electronic telephone book 10 may communicate with a central office of the telephone company to retrieve information for the user. Thus, the electronic telephone book 10 may retrieve information from the central office, such as phone numbers and advertisements, and may update information stored in the local drives 16 and 18.

FIG. 2 illustrates a block diagram of the electronic telephone book 10. A CPU 28 is coupled to ROM 30, RAM 32, modem 34, display controller 36 and drive interface 38. Modem 34 is connected to A/D converter 40 which is connected to the phone jack 24 and phone 42. Both the A/D converter 40 and phone 42 are coupled to the phone lines 44. The display controller 36 is coupled to display 12. Drive interface 38 is coupled to drives 16 and 18. An expansion RAM 48 is coupled to the RAM 32. A voice chip 49a is optionally coupled to CPU 28 and to speaker 49b.

In operation, the CPU 28 operates a program stored in ROM 30. Additional program code may be stored in RAM 32, expansion RAM 48 and drives 16 and 18. The CPU 28 outputs data to the display 12 and receives input commands from the display 12 through display controller 36. Communications with the telephone lines is performed through modem 34 and A/D converter 40.

Figure 3A:
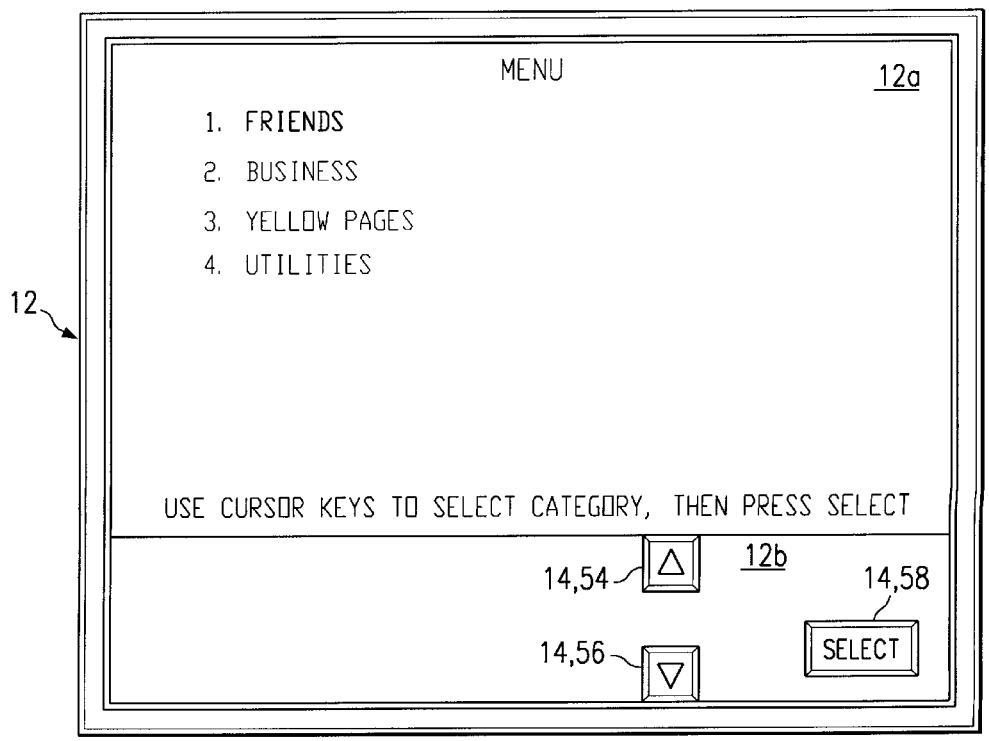
FIGS. 3a–f illustrate use of the electronic telephone book.

FIGS. 3a–f illustrate screens which could be used in operation of the electronic phone book. In FIG. 3a, the main menu is shown. It should be noted that this menu is for exemplary purposes only, and different menus may be provided for different applications. For example, the menu for a implementation of the electronic telephone book 10 used primarily in a business situation would be different than the menu for an electronic telephone book used primarily for home use.

In the embodiment illustrated in FIG. 3a, the main menu provides four selections: "Friends", "Business", "Yellow Pages" and "Utilities". Instructions are provided at the bottom of viewing area 12a to aid the user. In this case, three software buttons 14 are provided: Up and Down cursor keys 54 and 56, respectively, and a Select button 58. The user may choose one of the categories by using the cursor keys 54 and 56; the chosen category is highlighted. Once the proper category is chosen, the Select button 58 is pressed.

Figure 3B:
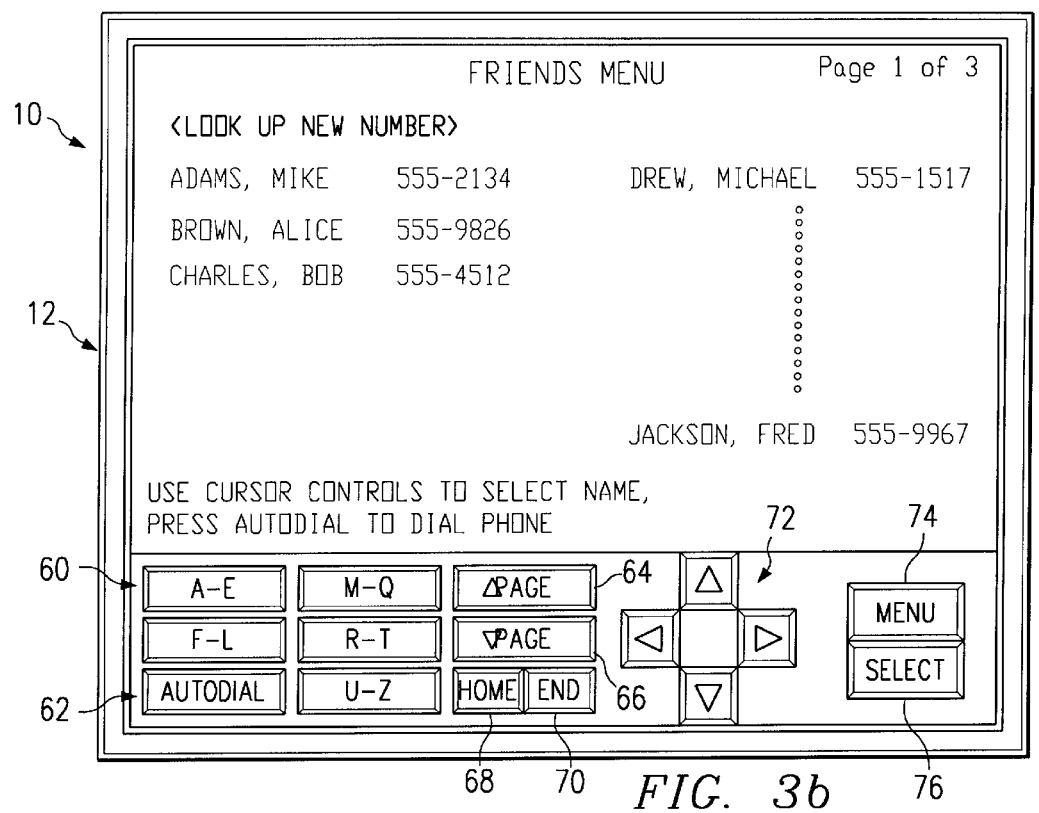

FIG. 3b illustrates an exemplary display after choosing the "Friends" category. After choosing the "Friends" category, a list of names is provided. The software buttons 14 include alphabetical look-up keys 60 which allow the user to move the display to start at a certain letter, an Autodial key 62, Page Up and Page Down keys 64 and 66, Home and End keys 68 and 70, cursor control keys 72, Menu key 74 and Select key 76. The Page Up and Down 64 and 66 change the display to read the previous or next page of output. The Home key 68 brings the display to the first entry in the list and the End key 70 brings the display to the last entry in the list. Cursor control keys 72 allow the user to highlight a desired name on the page. The Menu key 74 returns control back to the previous menu (i.e., to the main menu) and the Select key 76 enters the highlighted name as the desired selection. In this embodiment, pressing the Select key may provide additional information about the highlighted person, such as address and other information.

Figure 3C:
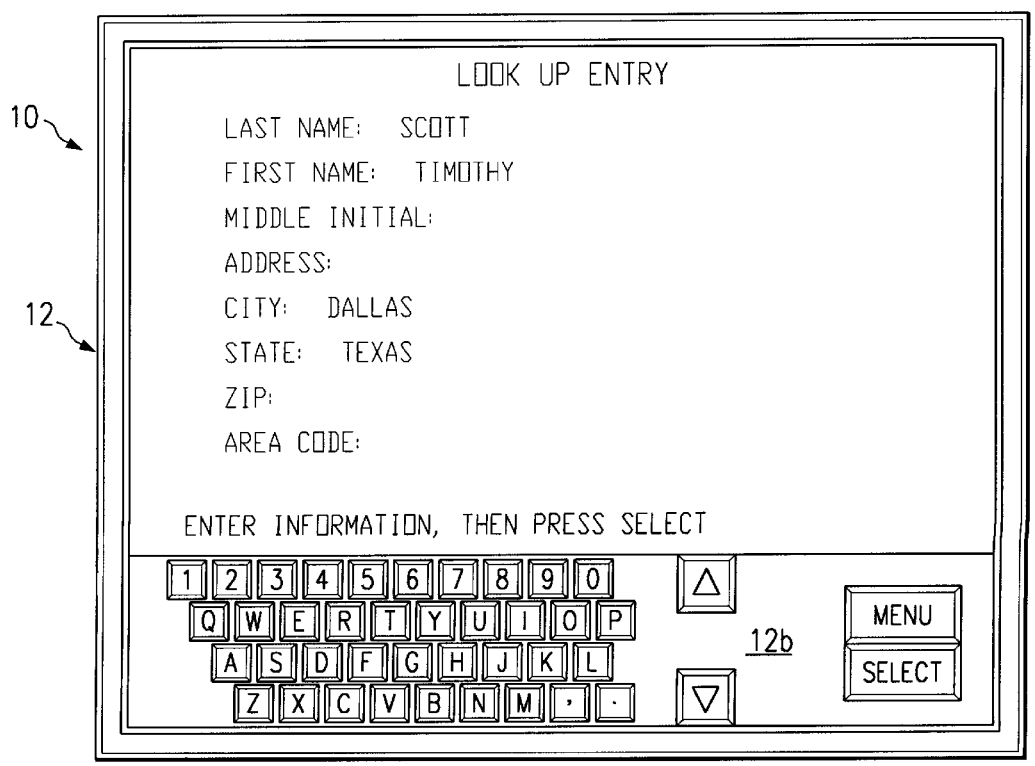

The "<Look-Up New Number>" selection allows the user to look up a number not in the displayed list. FIG. 3c illustrates a screen generated in connection with selecting the <Look-Up New Number> selection. In this instance, the control area 12b provides a keyboard in which data can be entered for retrieving a phone number. As can be seen in FIG. 3c, the user need not supply all the data.

Figure 3D:
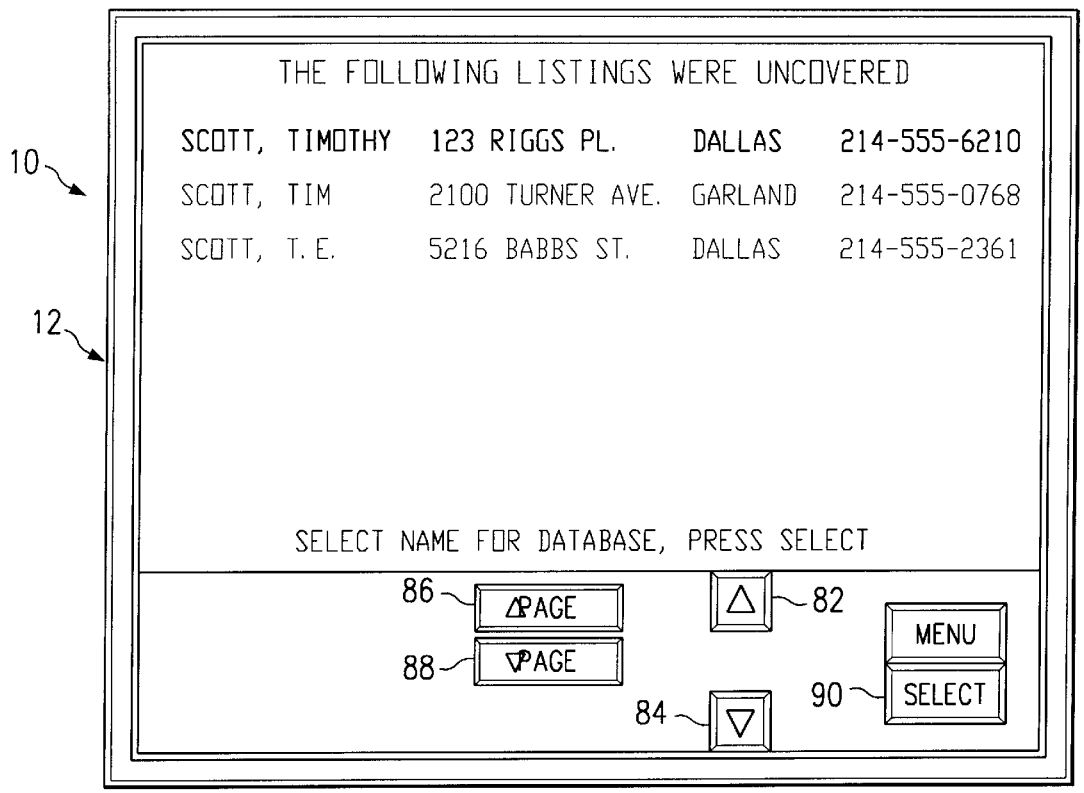

In FIG. 3d, a list of the names meeting the criteria is provided to the user. In order to generate the list, the electronic telephone book 10 sends the information entered by the user to the telephone company's central office which maintains the database of telephone listings. The database is searched for matching entries and equivalents. Thus, in FIG. 3d, both Dallas and Garland (a Dallas suburb) are searched as well as the names "Timothy", "Tim" and "T.E.". The user may choose from these names using the cursor keys 82 and 84 and the Page Up and Page Down keys 86 and 88. When the Select button 90 is pressed, the highlighted name will be entered into the user's local database of telephone numbers (in this case, the "Friends" database).

Figure 3E:
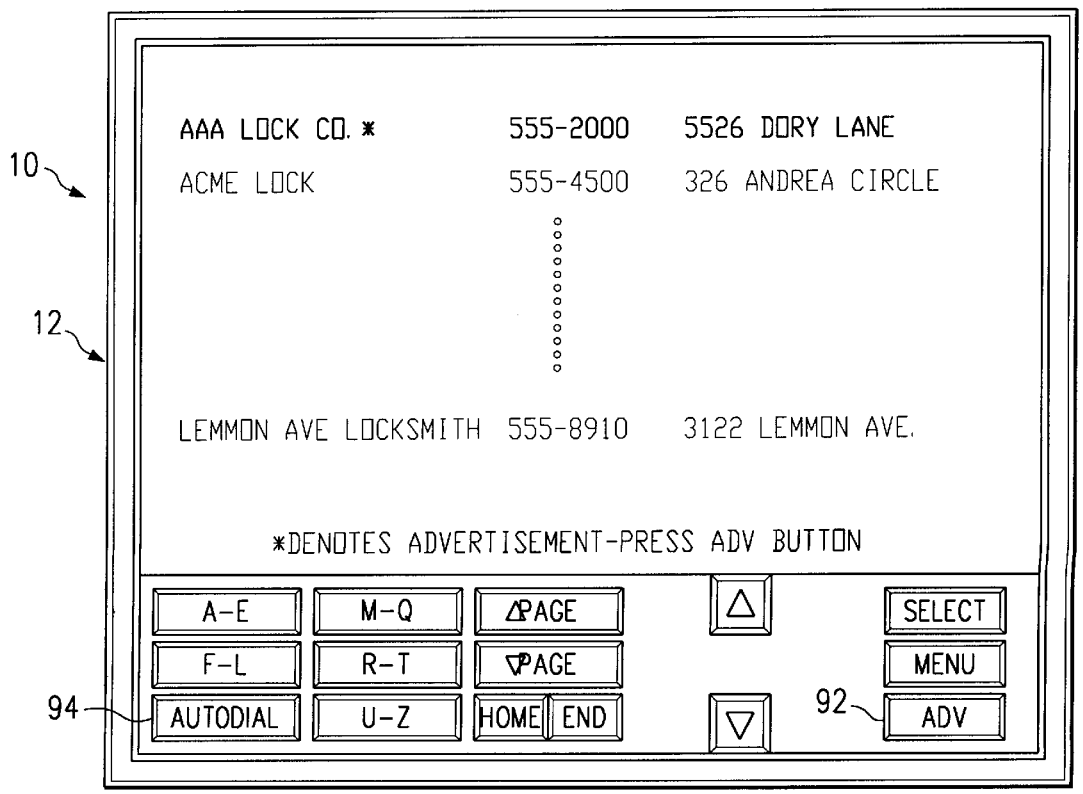

FIG. 3e illustrates a yellow pages directory listing. This listing would be generated through the yellow pages selection on the main menu, in a similar manner to the procedure shown in FIG. 3c. The user would be able to search the phone listings at the telephone company's central office, by name, or by keyword, as shown in FIG. 3e. In the example of FIG. 3e, the keyword "locksmith" was used which generated a listing of vendors in the user's area. The database search could include much greater detail between vendor and their respective products and services than allowed by the yellow pages. For example, using "toaster" as a keyword would generate a list which would include hardware stores, appliance stores and department stores. Some listings are designated by an asterisk (*) which informs the user that an advertisement is associated with the listing. The advertisement may be viewed by pressing the "ADV" button 92 after highlighting the listing. Alternatively, a desired listing may be automatically dialed by pressing the "Autodial" button 94.

Figure 3F:
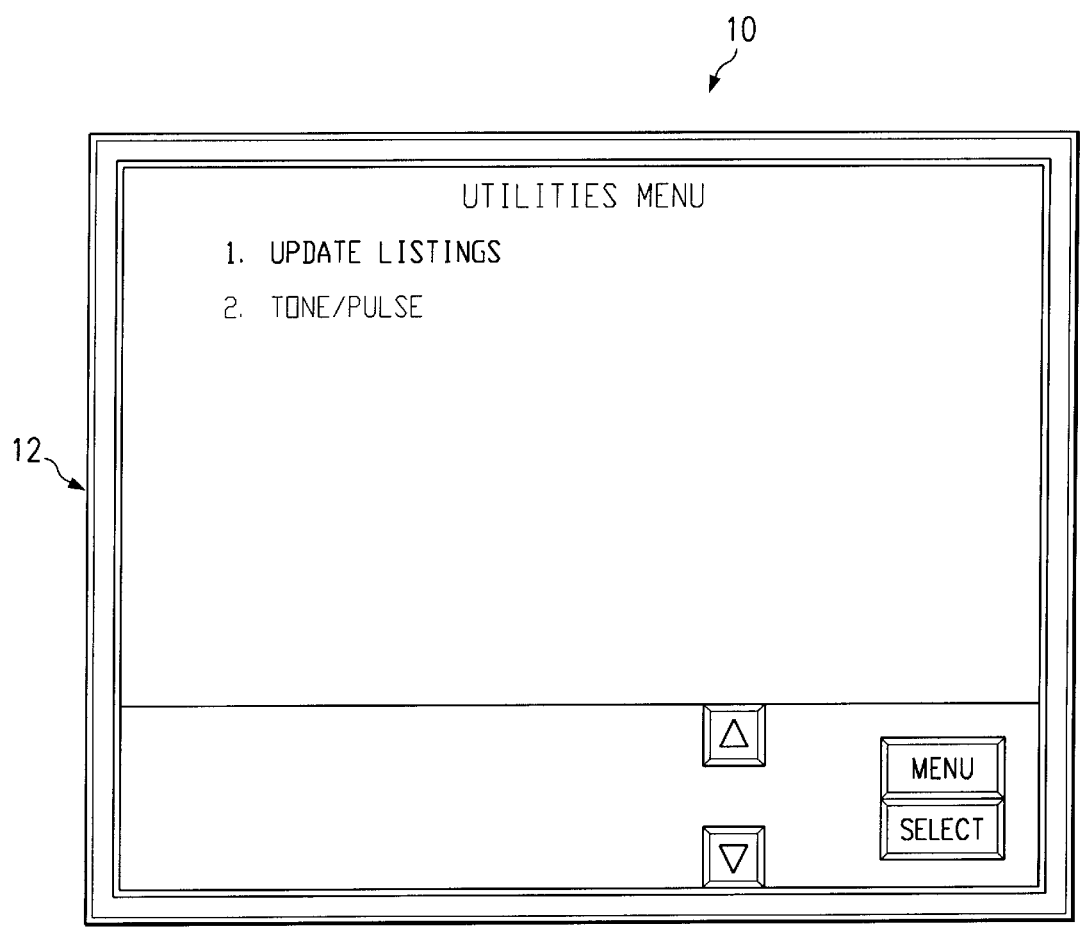

FIG. 3f illustrates an exemplary utilities menu. The "Update Listings" selection searches the listings in the user's local memory to determine whether the phone numbers are current. In the preferred embodiment, a global search for all listings, a search for selected listings, and a search for a single listing are supported. The "Tone/Pulse" selection allows the autodialing to be performed in either DTMF tones or pulses. Other utilities may also be provided.

In FIG. 2, an optional voice chip and speaker 49a–b are illustrated. The voice chip would allow the visually impaired to find a desired listing.

Additionally, the flexibility of the electronic telephone book 10 enables it to provide additional services with the evolution of telecommunication technology. For example, with an ISDN network, the display 12 could generate video as well as graphics taking advantage of the broad-band digital capacity of ISDN. Such a feature would allow, for example, a video advertisement to be output to the user.

The present invention provides significant advantages over the prior art. First, the need for telephone books is eliminated, since the most current listings may always be provided through the telephone company's central office. Second, the invention provides local databases which store the most frequently called numbers and allow autodialing for ease of use. Third, the electronic telephone book is customizable to a variety of applications.

Although the present invention and its advantages have been described in detail, it should be understood that various changes, substitutions and alterations can be made herein without departing from the spirit and scope of the invention as defined by the appended claims.

What is claimed is:

1. An electronic phone book comprising:
   processing circuitry;
   telephone interface circuitry for coupling the processing circuitry to a telephone line;

a display comprising output circuitry to output information and a control menu to input criteria data insufficient to obtain a unique telephone number based on said criteria data and sufficient to obtain a plurality of criteria telephone numbers based on said criteria data and input circuitry for generating control signals responsive to user interaction with said control menu; and communication circuitry coupled between said processing circuitry and said telephone line for retrieving said criteria telephone numbers for said display via the telephone line, said communication circuit being responsive to said control signals.

2. The electronic phone book of claim 1, wherein said output circuitry comprises a liquid crystal display screen.

3. The electronic phone book of claim 1, wherein said output circuitry comprises a thin film active cell display.

4. The electronic phone book of claim 1, wherein said input circuitry comprises pressure sensitive circuitry for determining the location of user contact with the output display.

5. The electronic phone book of claim 1, wherein said input circuitry comprises light detection circuitry for determining the location of contact with the output display.

6. The electronic phone book of claim 5, wherein said light detection circuitry comprises infrared light detection circuitry.

7. The electronic phone book of claim 1, wherein said electronic phone book further comprises voice circuitry coupled to said processing circuitry for providing audio output information.

8. The electronic phone book of claim 1, wherein said telephone interface circuitry comprises a modem.

9. The electronic phone book of claim 1, wherein said processing circuitry comprises a central processing unit and memory circuitry.

10. The electronic phone book of claim 9, wherein said processing circuitry further comprises a mass storage device.

11. The electronic phone book of claim 10, wherein said mass storage device comprises a disk.

* * * * *